United States Patent
Gleason

(10) Patent No.: US 11,860,068 B2
(45) Date of Patent: Jan. 2, 2024

(54) METHOD AND SYSTEM FOR OBTAINING PORTABLE GENERATOR TELEMETRY DATA OVER COAXIAL CABLE SYSTEMS

(71) Applicant: Charter Communications Operating, LLC, St. Louis, MO (US)

(72) Inventor: Nathan Gleason, Peyton, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 482 days.

(21) Appl. No.: 17/164,891

(22) Filed: Feb. 2, 2021

(65) Prior Publication Data
US 2022/0244144 A1    Aug. 4, 2022

(51) Int. Cl.
| | |
|---|---|
| G01M 99/00 | (2011.01) |
| H04Q 9/02 | (2006.01) |
| G05B 15/02 | (2006.01) |
| H02J 3/38 | (2006.01) |
| H04L 12/28 | (2006.01) |

(52) U.S. Cl.
CPC .......... G01M 99/005 (2013.01); G05B 15/02 (2013.01); H04Q 9/02 (2013.01); H02J 3/38 (2013.01); H04L 12/2801 (2013.01); H04Q 2209/883 (2013.01)

(58) Field of Classification Search
CPC ....... G01M 99/005; G05B 15/02; H04Q 9/02; H04Q 2209/883; H04Q 2209/30; H04Q 2209/60; H04Q 2209/826; H04Q 9/00; H02J 3/38; H02J 9/08; H02J 13/00004; H04L 12/2801
See application file for complete search history.

(56) References Cited

U.S. PATENT DOCUMENTS

| | | | |
|---|---|---|---|
| 6,308,787 B1 | 10/2001 | Alft | |
| 6,773,344 B1* | 8/2004 | Gabai | A63H 30/04 463/1 |
| 10,203,373 B1* | 2/2019 | Horst | G01R 31/343 |
| 2014/0277599 A1* | 9/2014 | Pande | H02J 3/32 700/22 |

(Continued)

OTHER PUBLICATIONS

Avnet, "Smart Diesel Generator Monitoring Solution", Retrieved Feb. 1, 2021, <https://www.avnet.com/wps/portal/us/solutions/iot/software/smart-applications/smart-diesel/>.

(Continued)

*Primary Examiner* — Charles Cai
(74) *Attorney, Agent, or Firm* — Young Basile Hanlon & MacFarlane, P.C.

(57) ABSTRACT

Methods and systems for remote monitoring of a portable generator. A method for monitoring portable generators includes removably attaching a telemetry module to a portable generator, the telemetry module including a processor, a service provider cable modem, and sensors for obtaining telemetry data from the portable generator, sending, to a service provider system via the service provider cable modem and over a service provider coaxial cable system, portable generator telemetry data when the portable generator is active, receiving, by the service provider cable modem from the service provider system, control commands based on actionable data generated from the portable generator telemetry data, and executing, by the processor, the control commands on the portable generator.

20 Claims, 6 Drawing Sheets

(56) References Cited

U.S. PATENT DOCUMENTS

2017/0289601 A1* 10/2017 Ganster .............. H04N 7/181
2019/0158975 A1*  5/2019 Petersen ............ H04W 56/001
2022/0156855 A1*  5/2022 Clydesdale ....... G06Q 30/0206

OTHER PUBLICATIONS

Morgana Siggins, "Generator Monitoring Best Practices", Retrieved Feb. 1, 2021, <https://www.dpstele.com/blog/generator-monitoring-system-best-practices.php>.
Generator Power Co., "Generator Hire Support Services From Generator Power", Retrieved Feb. 1, 2021, <https://generator-power.co.uk/services/>.

* cited by examiner

METHOD AND SYSTEM FOR OBTAINING PORTABLE GENERATOR TELEMETRY DATA OVER COAXIAL CABLE SYSTEMS

TECHNICAL FIELD

This disclosure relates to portable power management. More specifically, this disclosure relates to real-time portable generator telemetry reporting using Data Over Cable Service Interface Specifications (DOCSIS) systems.

BACKGROUND

Service providers provide Internet and deliver content (collectively "services") using a service provider infrastructure which includes a variety of components such as, but is not limited to, cable headend devices, optical nodes, amplifiers, and customer premises equipment (CPE). The service provider components are dispersed between a cable headend location and customer premises locations and connected via coaxial cables or hybrid fiber coaxial cables (collectively "coaxial cable system"). Provision of the services can be interrupted due to power outages at one or more of the service provider components. In these instances, service providers can deploy portable power generators to connect to and provide power to the service provider components. Service provider personnel have to check the conditions of each deployed portable generator to ensure delivery of services to customers. There currently does not exist mechanisms for obtaining telemetry data from deployed portable generators which do not have on-board or built-in sensors to provide real-time portable power management.

SUMMARY

Disclosed herein are method and systems for obtaining portable generator telemetry data over service provider coaxial cable systems.

In implementations, a method for monitoring portable generators includes removably attaching a telemetry module to a portable generator, the telemetry module including a processor, a service provider cable modem, and sensors for obtaining telemetry data from the portable generator, sending, to a service provider system via the service provider cable modem and over a service provider coaxial cable system, portable generator telemetry data when the portable generator is active, receiving, by the service provider cable modem from the service provider system, control commands based on actionable data generated from the portable generator telemetry data, and executing, by the processor, the control commands on the portable generator.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
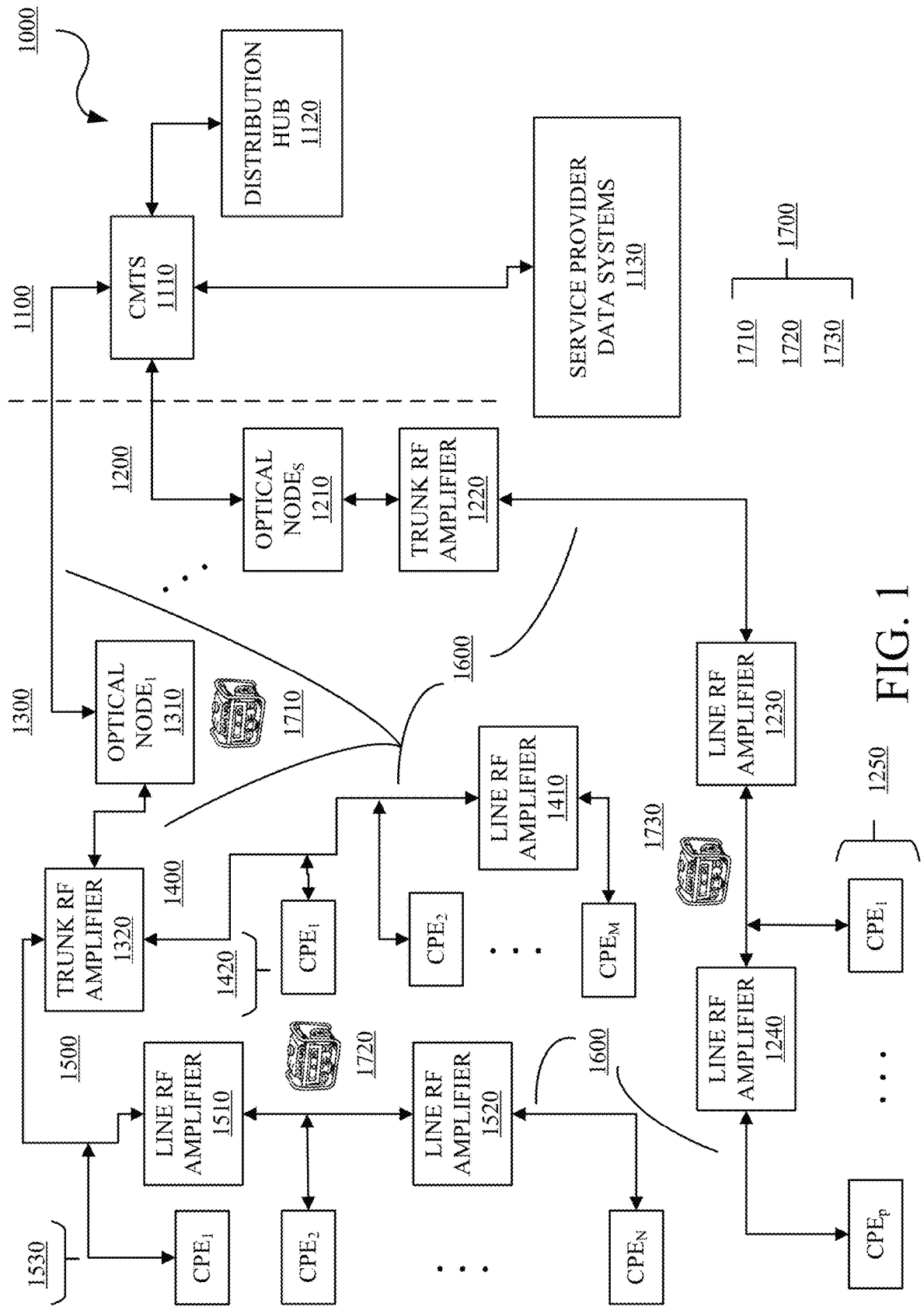
FIG. 1 is a diagram of an example network or architecture in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer", "computing device", or "computing platform" includes any unit, or combination of units, in a distributive platform, centralized platform, or combinations thereof, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods and systems for obtaining and processing portable generator telemetry data in accordance with implementations. In implementations, a telemetry module can be removably attached to a portable generator to collect and send telemetry data to a service provider headend. In implementations, the telemetry module can include, but is not limited to, multiple sensor modules, a processor, and a Data Over Cable Service Interface Specifications (DOCSIS) modem or service provider coaxial cable modem. In implementations, the multiple sensor modules can include, but are not limited to, a fuel sensor module, a current sensor module, a heat sensor module, a motor sensor module, and a global positioning system (GPS) module. In implementations, applications executing on the processor can process data collected by the sensor modules, which can then be sent to service provider headend via the coaxial cable modem and coaxial cable systems. The telemetry module enables outfitting portable generators which do not have reporting capabilities.

In implementations, service provider systems can receive the sensor data via a cable modem termination system (CMTS) and/or other headend devices. The service provider systems can process the sensor data to determine fuel availability, current generation, thermal profile of the portable generator, revolutions per minute (RPMs) of the portable generator, location of the portable generator, and like information. Alerts can be generated if one or more of the sensor data exceeds (or falls below) and/or matches a defined sensor threshold. In implementations, the service provider systems can correlate the sensor data against customer premises equipment data to determine or infer power outage conditions proximate to the deployed power generator. This can be used to control operation of the deployed power generators.

In implementations, the telemetry module enables use of the readily available coaxial cable systems to transmit sensor data for real-time portable power management. The sensor data remains within a service provider network due to use of the DOCSIS modem and the coaxial cable system. That is, Internet-based communications are not used to relay the sensor data between a deployed power generator with telemetry module and a service provider headend location. The telemetry modules can be used and reused on multiple portable generators and multiple portable generator types.

In implementations, power generators with removable attached telemetry modules can be deployed at nodes along the coaxial cable system which include, but are not limited to, optical nodes, trunk radio frequency (RF) amplifiers, line RF amplifiers, and the like which can be deactivated or non-operational due to a power outage. Gas levels, runtime, power output, and GPS location with respect to the deployed power generator can be fed to service provider data analytics applications to maintain service during power outages.

FIG. 1 is a diagram of an example network or architecture 1000 in accordance with some embodiments of this disclosure. The network 1000, can be, for example a service provider network. The network 1000 can include a headend system 1100 and deployment branches 1200 and 1300. The headend system 1100 can include, but is not limited to, a CMTS 1110, a distribution hub 1120, and service provider data systems 1130. The deployment branch 1200 can include, but is not limited to, an optical node 1210, a trunk RF amplifier 1220, a line RF amplifier 1230, and a line RF amplifier 1240. CPES 1250 such as CPE1, . . . CPEP can be connected to the deployment branch 1200. The deployment branch 1300 can include, but is not limited to, an optical node 1310 and a trunk RF amplifier 1320, which can include, but is not to deployment branches 1400 and 1500. The deployment branch 1400 can include, but is not limited to, a line RF amplifier 1410. CPES 1420 such as CPE1, . . . CPEM can be connected to the deployment branch 1400. The deployment branch 1500 can include, but is not limited to, a line RF amplifier 1510, and a line RF amplifier 1520. CPES 1530 such as CPE1, . . . OPEN can be connected to the deployment branch 1500. The CMTS 1100, the deployment branch 1200, the deployment branch, the deployment branch 1400, and the deployment branch 1500 can be connected by coaxial cable systems 1600, as applicable and appropriate.

In the event of a power outage, portable generators 1700 such as portable generators 1710, 1720, and 1730 can be connected to network nodes such as the optical node 1210, the trunk RF amplifier 1220, the line RF amplifier 1230, the line RF amplifier 1240, the optical node 1310, the trunk RF amplifier 1320, the line RF amplifier 1410, the line RF amplifier 1510, and/or the line RF amplifier 1520, as applicable and appropriate, via a coaxial cable tap connection as described herein. The portable generators 1700 can be equipped with telemetry modules, as described herein, to enable collection and sending of portable generator telemetry data to the service provider data systems 1130.

The CMTS 1100, the distribution hub 1120, and the service provider data systems 1130 can be connected to and/or be in communication with each other via, as appropriate and applicable, using wired and wireless techniques, systems, and devices, including but not limited to, hybrid coaxial fiber, coaxial fiber, the Internet, an intranet, a low power wide area network (LPWAN), a local area network (LAN), a wide area network (WAN), a public network, a private network, a cellular network, a WiFi-based network, a telephone network, a landline network, a public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof. The network 1000 and the components therein may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 2:
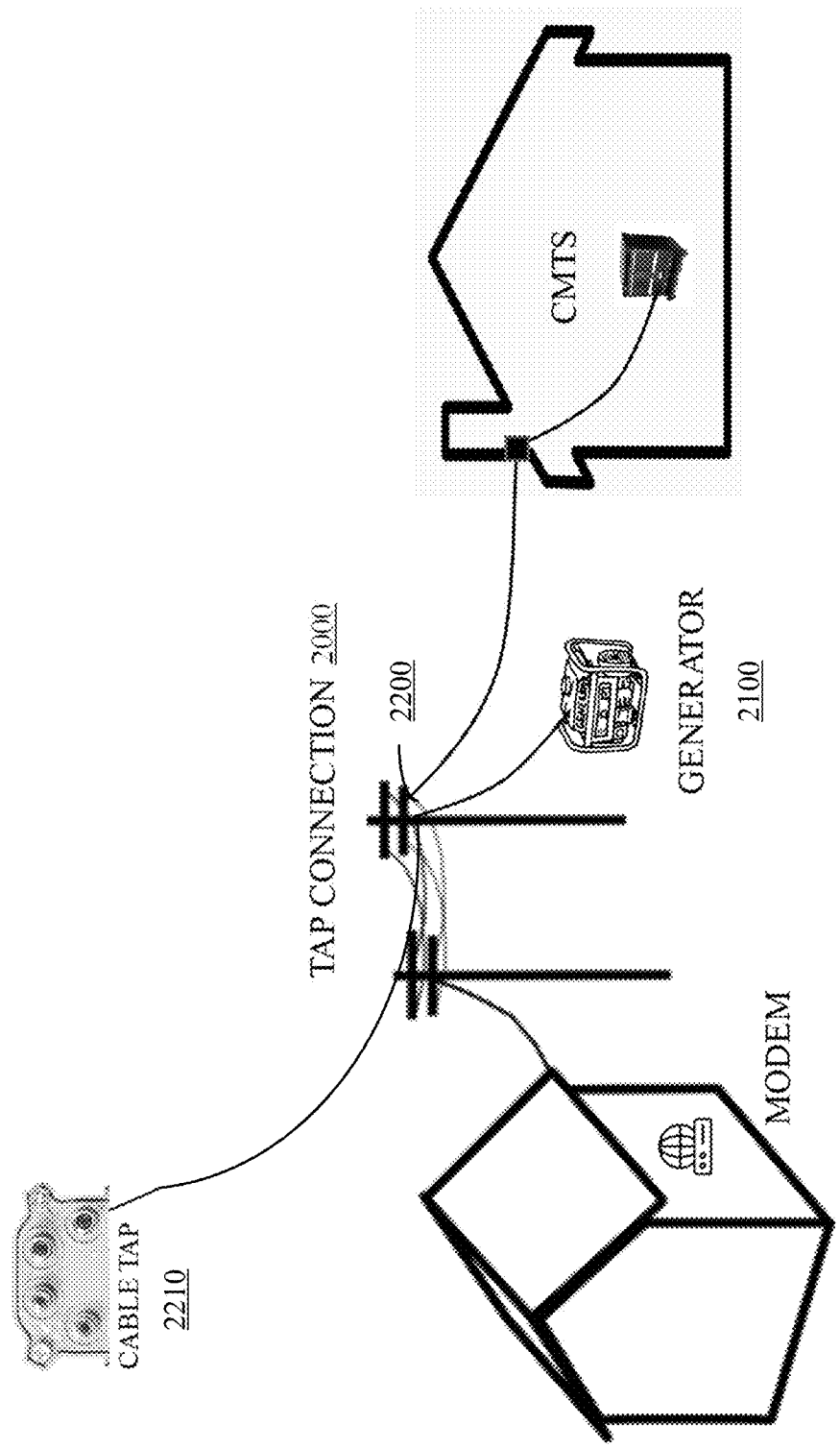
FIG. 2 is a diagram of an example coaxial cable tap connection in accordance with embodiments of this disclosure.

FIG. 2 is a diagram of an example coaxial cable tap connection 2000 in accordance with embodiments of this disclosure. With reference to FIG. 1 and FIG. 2, the coaxial cable tap connection 2000 can be between a portable generator 2100 and a network node 2200 as described herein. For example, the network node 2200 can be a point along a coaxial cable system 2300 which can connect a CPE such as a modem 2400 at a customer premises 2500 with a CMTS 2500 at a headend 2600. The network node 2200 can include a cable tap 2210 for connecting the portable generator 2100 to the network node 2200. In implementations, the modem 2400 is DOCSIS compliant.

Figure 3:
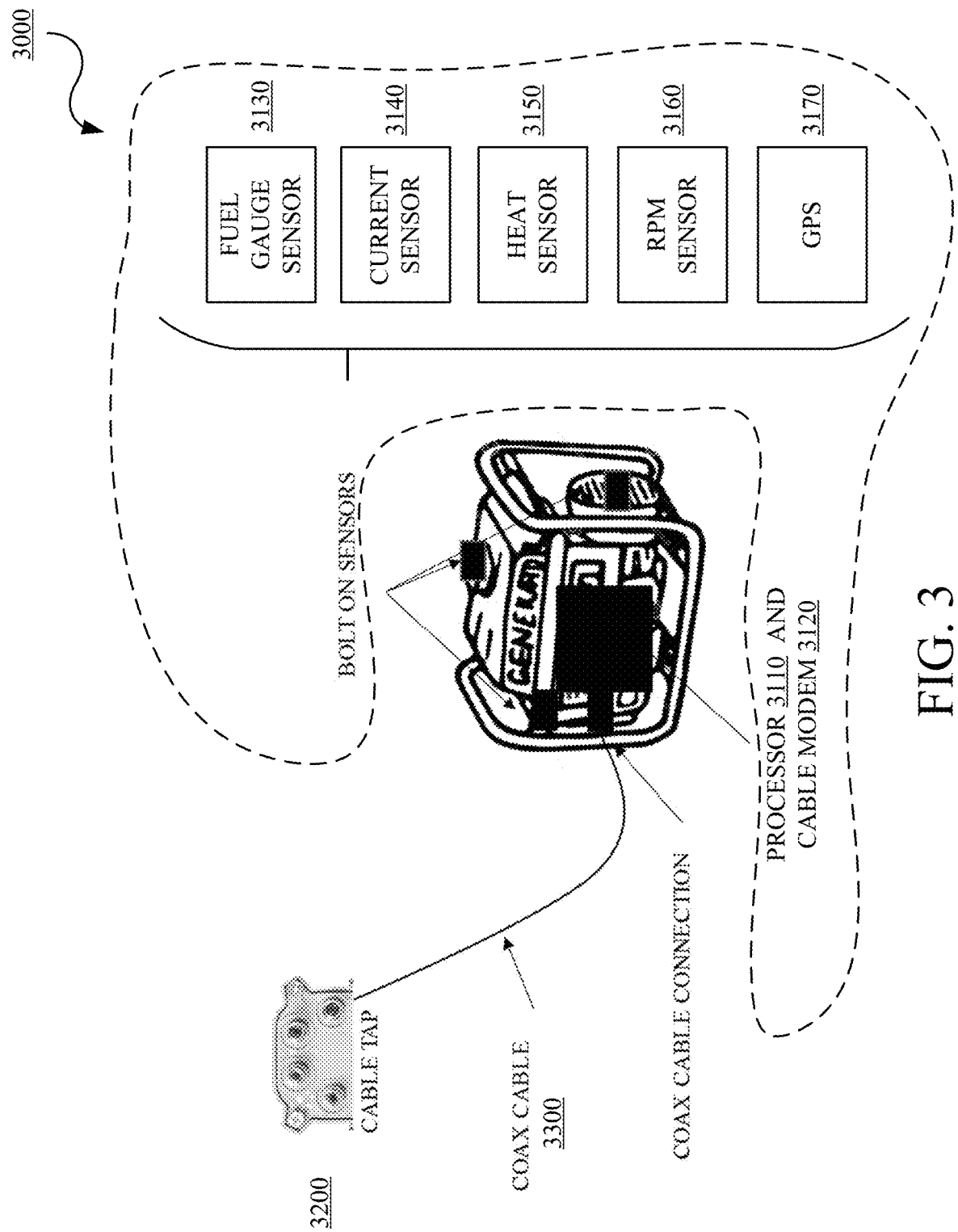
FIG. 3 is a diagram of an example portable generator with telemetry module in accordance with embodiments of this disclosure.

FIG. 3 is a diagram of an example portable generator 3000 with a telemetry module 3100 in accordance with embodiments of this disclosure. The portable generator 3000 can be, for example, the portable generators 1700 in FIG. 1. With reference to FIG. 1 and FIG. 2, The telemetry module 3100 can include, but is not limited to, a processor 3110 for processing data and/or executing commands, a DOCSIS modem or service provider coaxial cable modem 3120 to send and/or receive data and/or commands, a fuel sensor module 3130, a current sensor module 3140, a heat sensor module 3150, a motor sensor module 3160, and a global positioning system (GPS) module 3170. In implementations, the fuel sensor module 3130 can be a fuel generator cap with a built-in sensor rod that can send gas levels to the processor 3110 for processing. The telemetry module 3100 can include other sensors as appropriate and applicable without departing from the scope of the specification and claims. The telemetry module 3100 can be removably attached to the portable generator 3000 using for example, bolt on techniques or other mechanisms. The portable generator 3000 can be connected to a cable tap 3200 via a coaxial cable 3300. The portable generator 3000 can be controlled by the processor to turn on, turn off, ramp up RPMS, ramp down RPMS, and the like.

The CMTS 1100 is typically located in a service provider's central office, headend, or hub site and provides high speed data services, such as cable Internet or Voice over Internet Protocol, to service provider subscribers. The distribution hub 1120 can receive content from external sources, which is then distributed to service provider subscribers via the CMTS 1100.

The service provider data systems 1130 and applications executing thereon can receive portable generator telemetry data from deployed portable generators 1700 having telemetry modules. The service provider data systems 1130 can process and analyze the portable generator telemetry data to generate actionable information for portable power management. In implementations, the service provider data systems 1130 can receive data from CPEs 1250, 1420, and 1530, for example, and correlate that data with the portable generator telemetry data to generate additional actionable data. For example, the correlated data can indicate the degree of power outage in an area where the portable generators 1700 are deployed. The portable generators 1700 can be turned off if the correlated data indicates the power outage has been resolved. In implementations, a shutoff signal can be sent to the portable generator to turn itself off. In implementations, the service provider data systems 1130 can monitor all generators deployed and if a sensor trips for an issue then it will automatically generate a work order and have a technician dispatched to the location via the GPS data. In implementations, the service provider data systems 1130 can monitor generators using a unique number system to keep track of generator inventory versus generators deployed. In implementations, the service provider data systems 1130 can keep track of total gas and run time during an event. In implementations, the service provider data systems 1130 can keep track of generator maintenance and automatically schedule yearly maintenance and end of life.

Figure 4:
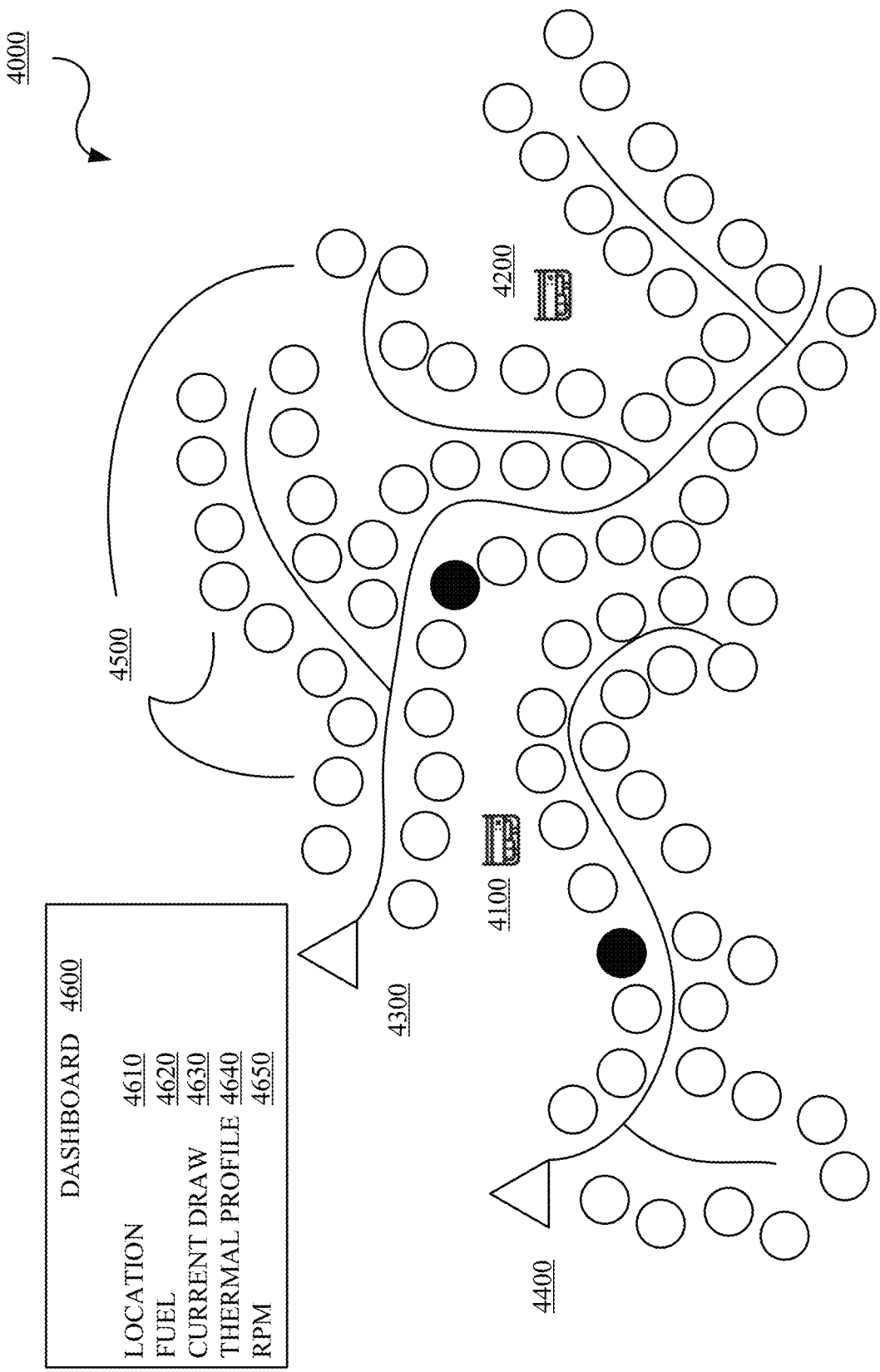
FIG. 4 is a graph of an example power outage visualization using portable generator telemetry data in accordance with embodiments of this disclosure.

FIG. 4 is a graph of an example power outage visualization 4000 using portable generator telemetry data in accordance with embodiments of this disclosure. The visualization 4000 can show positions of deployed generators 4100 and 4200, nodes 4300 and 4400, CPEs 4500, and the like (collectively "assets") in an impacted area. This can show whether deployed power generators can be turned off. For example, the service provider data systems 1130 can cut the generator off when a defined number of CPEs, DOCSIS modems, and/or devices have recovered and power is stable. In implementations, the ability to turn on/off the power generators can assist with respect to power surges on a power grid. In implementations, the visualization 4000 can include a dashboard 4600 which can show GPS data 4610, fuel data 4620, current draw 4630, thermal profile 4640, RPMS 4650, and the like for deployed power generators. For example, the fuel data 4620 can be used to gauge when to dispatch for refuel, the current draw 4630 can be used to monitor current pull on the generator and to estimate time for gas refill, the thermal profile 4640 can be used to determine if the generator is overloaded and heat damage may occur, and the RPMS 4650 can be used to gauge load on the generator.

The CPEs 1250, 1420, 1530, and 4500 can be, but are not limited to, end user devices, modems, routers, network switches, gateways, set-top boxes, fixed mobile convergence products, home networking adapters and Internet access gateways that enable customers to access a service provider's services and distribute them in a residence, enterprise, office, or like infrastructure. In implementations, the CPEs 1250, 1420, 1530, and 4500 can be equipment located at a customer's premises and connected with a service provider's telecommunication equipment, including for example, CMTS 1100. In implementations, the CPEs 1250, 1420, 1530, and 4500 can be a DOCSIS based or complaint device which can send/or and receive data and/or information from a cable headend over coaxial cable systems.

Operationally, with reference to FIGS. 1-FIG. 4, telemetry modules such as telemetry module 3100, can be attached to power generators. The power generators can be deployed in the field or non-deployed. In the event of a power outage, power generators can be connected to coaxial cable taps at network nodes effected by the power outage and turned on accordingly. In implementations, power generators that are already connected, can be turned on via the attached telemetry module. The service provider system can monitor the deployed portable generators. Telemetry data from the deployed power generators can be sent to a service provider data and/or analytics system via the service provider cable modem in the telemetry module and the coaxial cable system. The telemetry data remains contained within the service provider system as Internet or other communication systems are not needed to get the telemetry data to the service provider headend, the CMTS, and/or the like. The service provider data and/or analytics system can analyze the telemetry data along with customer premises data to present actionable data, in tabular, dashboard, and/or map formats as described herein. For example, the power generator can be turned off if the power outage is resolved, the power generator can be controlled to run slower in view of stabilizing power conditions as inferred by the actional data, the power generator can be controlled to run slower in view of thermal profile, a technician can be scheduled in view of fuel availability or issues with respect to the portable generator indicated by the telemetry data, and the like.

Figure 5:
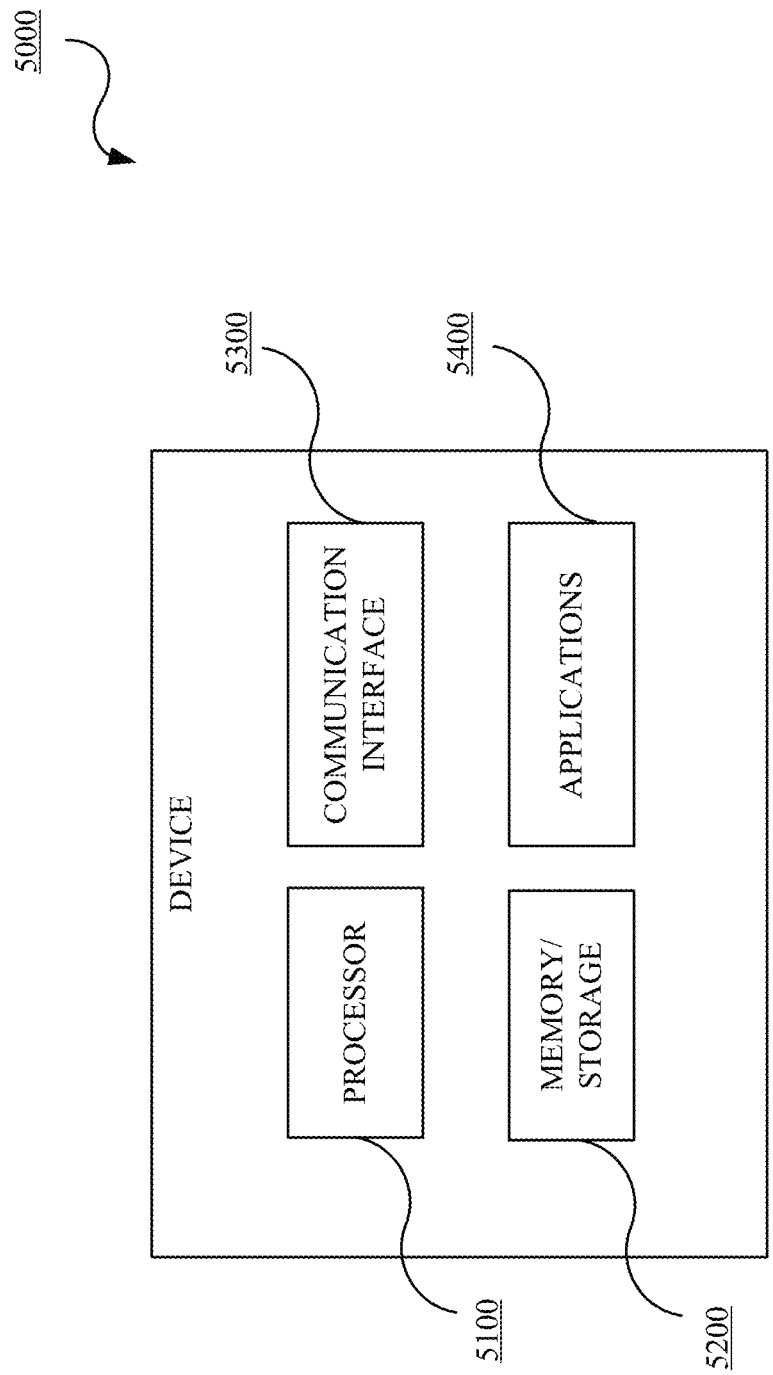
FIG. 5 is a block diagram of an example of a device in accordance with embodiments of this disclosure.

FIG. 5 is a block diagram of an example of a device 5000 in accordance with embodiments of this disclosure. The device 5000 may include, but is not limited to, a processor 5100, a memory/storage 5200, a communication interface 5300, and applications 5400. The device 5000 can include or implement, for example, the headend system 1100, the deployment branches 1200 and 1300, the CMTS 1110, the distribution hub 1120, the service provider data systems 1130, the optical node 1210, the trunk RF amplifier 1220, the line RF amplifier 1230, the line RF amplifier 1240, the CPES 1250, the optical node 1310, the trunk RF amplifier 1320, the deployment branches 1400 and 1500, the line RF amplifier 1410, the CPES 1420, the line RF amplifier 1510, the line RF amplifier 1520, the CPES 1530, the portable generators 1700, the portable generator 2100, the network node 2200, the modem 2400, the CMTS 2500, the portable generator 3000, the telemetry module 3100, the processor 3110, the DOCSIS modem or service provider coaxial cable modem 3120, the fuel sensor module 3130, the current sensor module 3140, the heat sensor module 3150, the motor sensor module 3160, the GPS module 3170, the deployed generators 4100 and 4200, the nodes 4300 and 4400, and the CPES 4500. In an implementation, appropriate memory/storage 5200 may store the telemetry data, the CPE data, and the like. In an implementation, appropriate memory/storage 5200 is encoded with instructions for at least collecting the telemetry data, the CPE data, controlling the portable generator, generating actionable data, and the like. The techniques or methods described herein may be stored in appropriate memory/storage 5200 and executed by the appropriate processor 5100 in cooperation with the memory/storage 5200, the communications interface 5300, and applications 5400, as appropriate. The device 5000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 6:
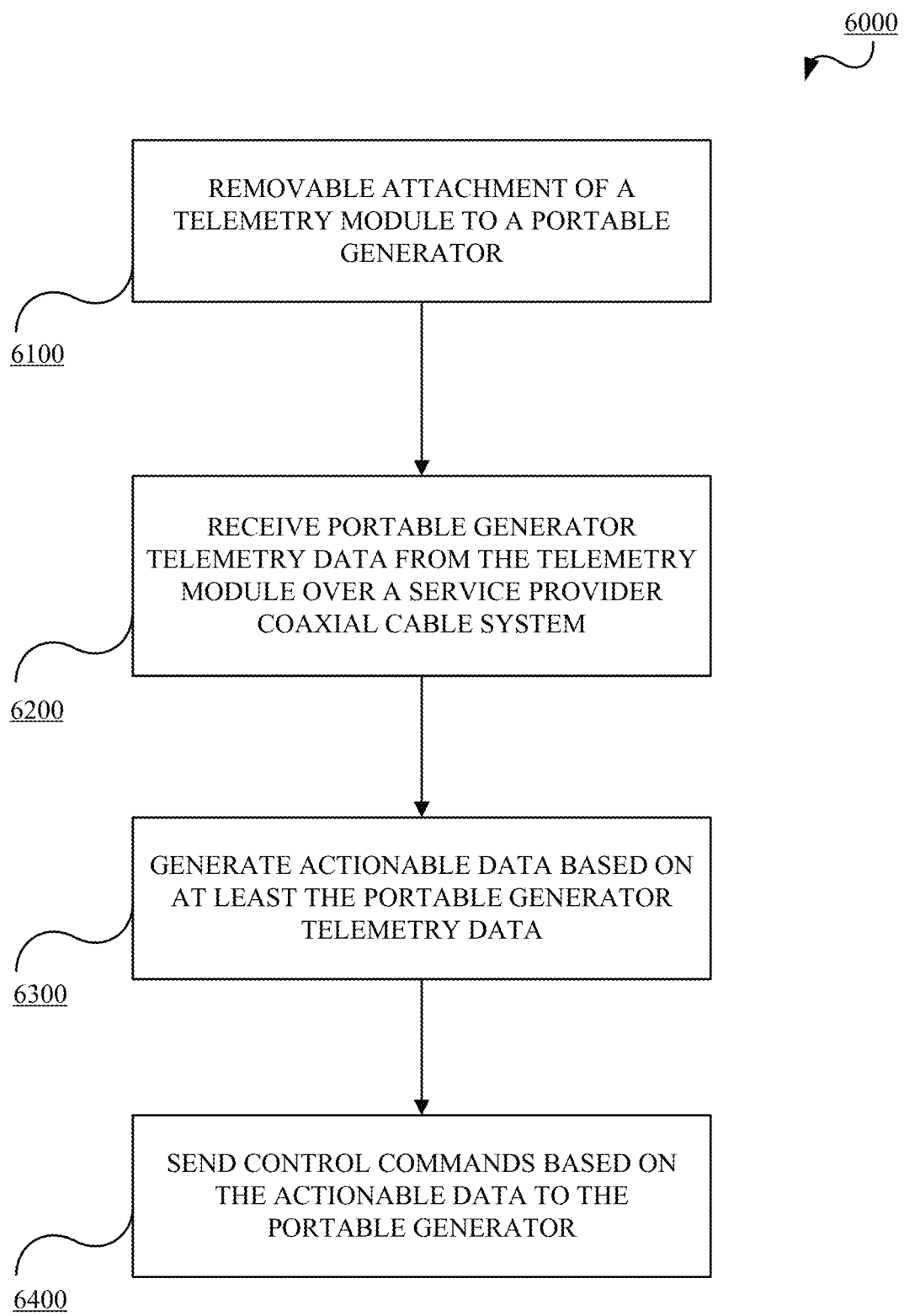
FIG. 6 is a flowchart of an example method for obtaining and processing portable power telemetry data in accordance with embodiments of this disclosure.

FIG. 6 is a flowchart of an example method 6000 for monitoring portable generators using telemetry data sent over coaxial cable systems in accordance with embodiments of this disclosure. The method 6000 includes: removably attaching 6100 a telemetry module to a portable generator; receiving 6200 portable generator telemetry data from the telemetry module over a service provider coaxial cable system; generating 6300 actionable data based on at least the portable generator telemetry data; and sending 6400 control commands based on the actionable data to the portable generator. For example, the method 6000 may be implemented, as applicable and appropriate, by the headend system 1100, the deployment branches 1200 and 1300, the CMTS 1110, the distribution hub 1120, the service provider data systems 1130, the optical node 1210, the trunk RF amplifier 1220, the line RF amplifier 1230, the line RF amplifier 1240, the CPES 1250, the optical node 1310, the trunk RF amplifier 1320, the deployment branches 1400 and 1500, the line RF amplifier 1410, the CPES 1420, the line RF amplifier 1510, the line RF amplifier 1520, the CPES 1530, the portable generators 1700, the portable generator 2100, the network node 2200, the modem 2400, the CMTS 2500, the portable generator 3000, the telemetry module 3100, the processor 3110, the DOCSIS modem or service provider coaxial cable modem 3120, the fuel sensor module 3130, the current sensor module 3140, the heat sensor module 3150, the motor sensor module 3160, the GPS module 3170, the deployed generators 4100 and 4200, the nodes 4300 and 4400, the CPES 4500, the processor 5100, the memory/storage 5200, the communication interface 5300, and the applications 5400.

The method 6000 includes removably attaching 6100 a telemetry module to a portable generator. A telemetry module can include multiple sensors for obtaining operational data regarding the portable power generator, a processor for processing the data, and a cable modem for sending the data to a service provider system. In implementations, the cable modem is a DOCSIS compliant modem. In implementations, the telemetry module can include a level sensor to detect portable generator physical stability.

The method 6000 includes receiving 6200 portable generator telemetry data from the telemetry module over a service provider coaxial cable system. The sensor data is sent via the coaxial cable system and the cable modem, both owned and/or operated by the service provider. As such, the data is internal to the service provider system and does not use external communication platforms such as the Internet. In implementations, the telemetry data can be received on a periodic basis, event-drive basis such as heat warning, low fuel, RPM surge, and the like, and/or combinations thereof.

The method 6000 includes generating 6300 actionable data based on at least the portable generator telemetry data. A data analytics system in the service provider system analyzes the data to generate actionable data which can be presented as visualization data. In implementations, the service provider system can also receive data from CPEs present on the service provider system. The data analytics system can correlate the CPE data and the portable generator telemetry data to generate the actionable data.

The method 6000 includes sending 6400 control commands based on the actionable data to the portable generator. The service provider system can send commands and/or instructions to the processor on the telemetry module to control one or more operations of the portable generator.

In general, a method for monitoring portable generators includes removably attaching a telemetry module to a portable generator, the telemetry module including a processor, a service provider cable modem, and sensors for obtaining telemetry data from the portable generator, sending, to a service provider system via the service provider cable modem and over a service provider coaxial cable system, portable generator telemetry data when the portable generator is active, receiving, by the service provider cable modem from the service provider system, control commands based on actionable data generated from the portable generator telemetry data, and executing, by the processor, the control commands on the portable generator.

In implementations, the method further comprises connecting the portable generator with a coaxial cable to a service provider node on the service provider coaxial cable system upon occurrence of a power outage. In implementations, the service provider node is any of an optical node and a radio frequency amplifier. In implementations, the sending is done on a periodic interval. In implementations, the sending is done upon occurrence of an event. In implementations, the sensors include at least one selected from a fuel sensor module, a current sensor module, a heat sensor module, a motor sensor module, a global positioning system module, and a level sensor. In implementations, the actionable data is based on customer premises equipment data received and correlated with the portable generator telemetry data by the service provider system. In implementations, the control commands are one of a turn on command, turn off command, ramp down command, and ramp up command.

In general, a portable device includes a remote mobile generator and a monitoring unit configured for detachable attachment to the remote mobile generator. The monitoring unit including sensors configured to collect operational data about the remote mobile generator, a processor connected to the sensors, and a cable modem connected to the processor. The processor configured to process the operational data for sending to a service provider system and to execute instructions received from the service provider system based on the operational data. The cable modem configured to send the operational data and receive the instructions from the service provider analytical system over a coaxial cable infrastructure to the service provider system, where the cable modem and the coaxial cable infrastructure are at least operated by a same service provider.

In implementations, the cable modem and the coaxial cable infrastructure are Data Over Cable Service Interface Specifications DOCSIS compliant. In implementations, the sensors include at least one selected from a fuel sensor module, a current sensor module, a heat sensor module, a motor sensor module, a global positioning system module, and a level sensor. In implementations, the sensors, the processor and the cable modem are configured to send the operational data on a periodic interval when the portable device is turned on. In implementations, the sensors, the processor and the cable modem are configured to send the operational data on an event-driven basis when the portable device is turned on. In implementations, the instructions are one of a turn on command, turn off command, ramp down command, and ramp up command.

In general, a system for monitoring portable power generation including a cable operator system including a coaxial cable network and network nodes, a portable generator device configured to be connected to a network node in the event of a power outage, the portable generator device comprising a generator and a telemetry unit configured for removable attachment to the generator. The telemetry unit including one or more data collection devices configured to obtain telemetry data from the generator, a computing device configured to control telemetry data collection from the one or more data collection devices, transmission to the cable operator system, and execution of generator configuration signals from the cable operator system, and a cable operator modem controlled by the computing device to transmit the telemetry data to the cable operator system over the coaxial cable network. The cable operator system configured to generate visualization data and the generator configuration signals from the telemetry data and send the generator configuration signals to the portable generator device.

In implementations, the cable operator system configured to receive customer premise equipment data from cable operator subscribers, associate the customer premise equipment data with the telemetry data, and generate the generator configuration signals from the associated data. In implementations, the cable operator modem and the coaxial cable network are Data Over Cable Service Interface Specifications DOCSIS compliant. In implementations, the one or more data collection devices include at least one selected from a fuel sensor, a current sensor, a heat sensor, a motor sensor, a global positioning system device, and a level sensor. In implementations, the portable generator device is configured to send the telemetry data on an occurrence of an event and periodically when the portable generator device is turned on. In implementations, the generator configuration signals are one of a power on command, power off command, increase power generation, and decrease power generation.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for monitoring portable generators, the method comprising:
   removably attaching a telemetry module to a portable generator, the telemetry module including a processor, a service provider cable modem, and sensors for obtaining telemetry data from the portable generator;
   sending, to a service provider system via the service provider cable modem and over a service provider coaxial cable system, portable generator telemetry data in response to the portable generator being active;
   receiving, by the service provider cable modem from the service provider system, control commands based on actionable data generated from the portable generator telemetry data and customer premises data; and
   executing, by the processor, the control commands on the portable generator.

2. The method of claim 1, further comprising:
   connecting the portable generator with a coaxial cable to a service provider node on the service provider coaxial cable system upon occurrence of a power outage.

3. The method of claim 2, wherein the service provider node is any of an optical node and a radio frequency amplifier.

4. The method of claim 1, wherein the sending is done on a periodic interval.

5. The method of claim 1, wherein the sending is done upon occurrence of an event.

6. The method of claim 1, wherein the sensors include at least one selected from a fuel sensor module, a current sensor module, a heat sensor module, a motor sensor module, a global positioning system module, and a level sensor.

7. The method of claim 1, wherein the customer premises data is correlated with the portable generator telemetry data by the service provider system.

8. The method of claim 1, wherein the control commands are one of a turn on command, turn off command, ramp down command, and ramp up command.

9. A portable device comprising:
a remote mobile generator; and
a monitoring unit configured for detachable attachment to the remote mobile generator, the monitoring unit comprising:
sensors configured to collect operational data about the remote mobile generator;
a processor connected to the sensors, the processor configured to process the operational data for sending to a service provider system and to execute instructions received from the service provider system based on the operational data; and
a cable modem connected to the processor, the cable modem configured to send the operational data and receive the instructions from the service provider system over a coaxial cable infrastructure to the service provider system, the instructions based on the operational data and customer premises data,
wherein the cable modem and the coaxial cable infrastructure are at least operated by a same service provider.

10. The portable device of claim 9, wherein the cable modem and the coaxial cable infrastructure are Data Over Cable Service Interface Specifications (DOCSIS) compliant.

11. The portable device of claim 9, wherein the sensors include at least one selected from a fuel sensor module, a current sensor module, a heat sensor module, a motor sensor module, a global positioning system module, and a level sensor.

12. The portable device of claim 9, wherein the sensors, the processor and the cable modem are configured to send the operational data on a periodic interval when the portable device is turned on.

13. The portable device of claim 12, wherein the sensors, the processor and the cable modem are configured to send the operational data on an event-driven basis when the portable device is turned on.

14. The portable device of claim 9, wherein the instructions are one of a turn on command, turn off command, ramp down command, and ramp up command.

15. A system for monitoring portable power generation, the system comprising:
a cable operator system including a coaxial cable network and network nodes;
a portable generator device configured to be connected to a network node in the event of a power outage, the portable generator device comprising:
a generator; and
a telemetry unit configured for removable attachment to the generator, the telemetry unit comprising:
one or more data collection devices configured to obtain telemetry data from the generator;
a computing device configured to control telemetry data collection from the one or more data collection devices, transmission to the cable operator system, and execution of generator configuration signals from the cable operator system; and
a cable operator modem controlled by the computing device to transmit the telemetry data to the cable operator system over the coaxial cable network; and
the cable operator system configured to:
generate visualization data and the generator configuration signals from the telemetry data; and
send the generator configuration signals to the portable generator device.

16. The system of claim 15, the cable operator system configured to:
receive customer premise equipment data from cable operator subscribers;
associate the customer premise equipment data with the telemetry data; and
generate the generator configuration signals from the associated data.

17. The system of claim 16, wherein the cable operator modem and the coaxial cable network are Data Over Cable Service Interface Specifications (DOCSIS) compliant.

18. The system of claim 17, wherein the one or more data collection devices include at least one selected from a fuel sensor, a current sensor, a heat sensor, a motor sensor, a global positioning system device, and a level sensor.

19. The system of claim 18, wherein the portable generator device is configured to send the telemetry data on an occurrence of an event and periodically when the portable generator device is turned on.

20. The system of claim 19, wherein the generator configuration signals are one of a power on command, power off command, increase power generation, and decrease power generation.

* * * * *